Nov. 20, 1951 W. H. SHAW 2,575,844
FEEDBACK NEUTRALIZATION MEANS FOR A TELEPHONE SYSTEM
Filed Oct. 19, 1948
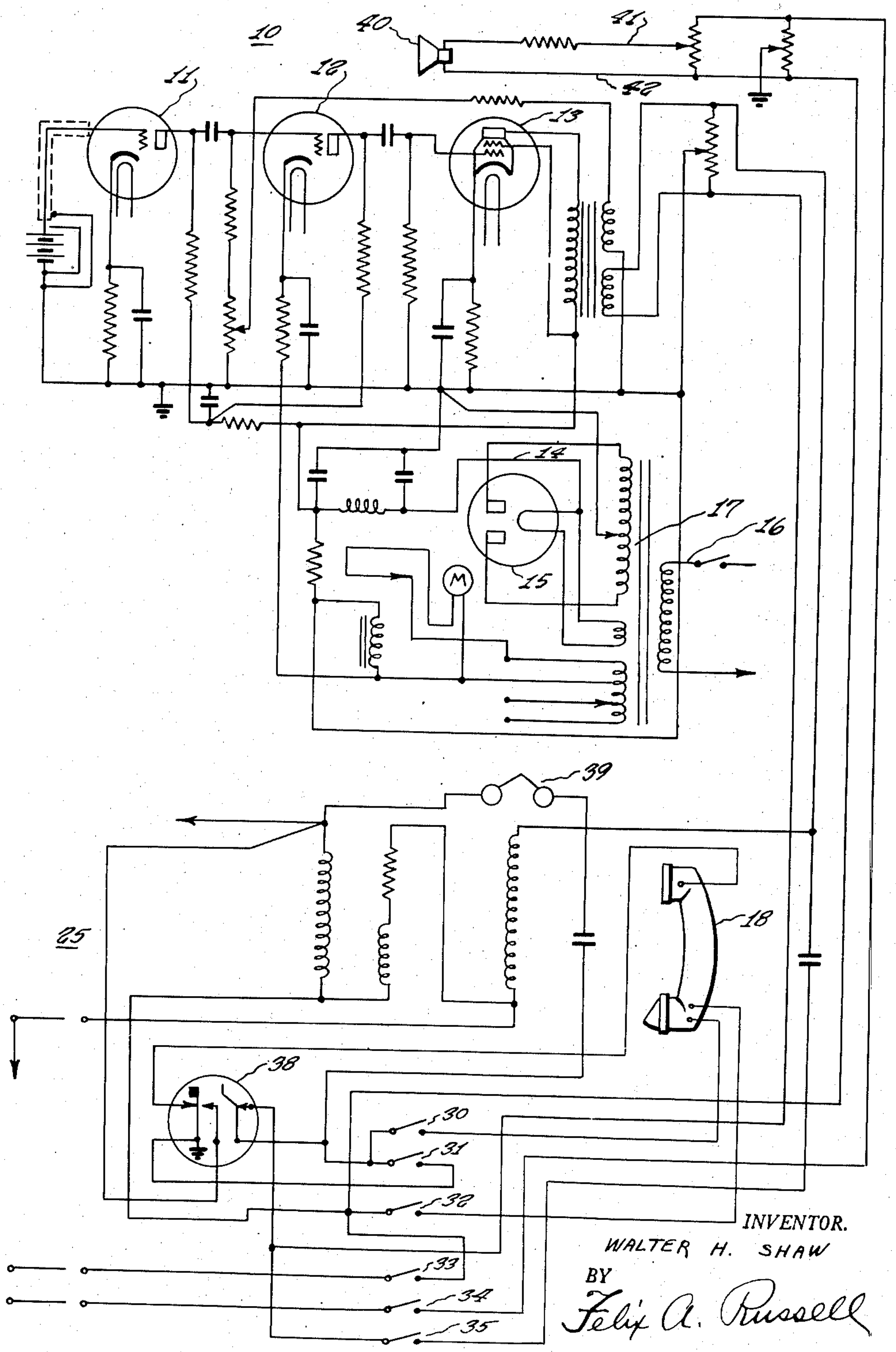
INVENTOR.
WALTER H. SHAW
BY
Felix A. Russell
ATTORNEY Patented Nov. 20, 1951 2,575,844

UNITED STATES PATENT OFFICE 2,575,844

FEEDBACK NEUTRALIZATION MEANS FOR TELEPHONE SYSTEMS

Walter H. Shaw, Miami, Fla., assignor of two per cent to Harry L. McKellops, Miami, Fla., and ninety-eight per cent to Harold B. Shapiro, Miami Beach, Fla.

Application October 19, 1948, Serial No. 55,369

2 Claims. (Cl. 179—2)

This invention relates generally to communication systems having a receiver and a transmitter and more specifically to such systems including apparatus and means for combining a receiver and transmitter system having means for selectively utilizing the same as a conventional telephone and/or as a loud speaker and microphone.

Systems have been developed for utilizing a combination receiving and sending circuit in conjunction with a telephone system and a loud speaker connected therewith which can be used either for part of a communication or for a public address system in an amplified manner. However these systems utilize the same receiving and sending channels and as a consequence thereof, the amplification properties are substantially lessened.

By means of the present invention, therefore, there is now provided means for utilizing a receiving and sending circuit in combination, together with the usual telephone circuit, but whereby the channels for sending and receiving are substantially isolated from each other so that the interference effects and feed back properties resultant in the prior systems may be substantially eliminated and obviated.

Therefore, it is the primary object of the present invention to provide a communication system utilizing a combination receiver and sending unit which may have great amplification properties in contradistinction to the prior systems used in the communication arts.

Another object of the present invention is to provide a portable intercommunication system whereby a combined receiver and transmitter may be constructed as having separate receiving and transmitting channels to neutralize feed back effects.

Another object of the present invention is to provide, in a combined transmitter system, separate transmitter receiver channels whereby feed back effects usually inherent in such systems are substantially eliminated.

Another object of the present invention is to provide an improved self-powered circuit which can be connected to a telephone line without any complication or interference of the normal operation of such line and wherein the receiving and transmitting channels included in the new device are substantially isolated in interference effects.

Another object of the present invention is to provide a portable, readily utilizable, combined receiver and transmitter having circuits which are separate and distinct from each other so as to obviate feed back effects and other interference noises inherent in other similar devices.

Another object of the present invention is to provide in a communication circuit a loudspeaker which is connected to a receiving circuit so as to keep the feed back interferences between said receiving circuit and said transmitting circuit at a minimum.

Another object of the present invention is to provide in a combined receiver and transmitter circuit means for isolating said transmitter and receiver circuits from each other so that greater amplification characteristics are obtainable from said outlet circuits.

Still another object of the present invention is to provide means and apparatus instrumental in carrying out the above objects of the invention as well as other objects which may be inherent in utilization of the present device.

Referring to the drawing:

The figure shown is a circuit diagram illustrating a preferred embodiment of the invention and useful in showing the electrical operation thereof so as to describe the separate arrangement of the receiving and sending channels of the novel communication system.

Generally speaking, telephone systems have a combined receiver and transmitter in order to utilize the same circuits for both receiving and transmitting. As a result thereof, feed back effects are generated which, in the operation of the system, have a deleterious effect reducing the amplification and substantially lessening the efficiency of the system. In the present novel system, separate circuits and means are utilized in receiving and transmitting circuits which tend to buffer the receiving and transmitting circuits and to substantially eliminate feed back therebetween. Resultant therefrom is an increased step up of the amplification of the system with a consequent gain in audible range and utility over the prior systems.

In the figure, an amplifier 10 comprising a plurality of electronic discharge devices or vacuum tubes 11, 12 and 13, powered by means of a rectifier circuit 14 including a tube 15 having its power source provided by an input 16, which may be the ordinary 60 cycle A. C. power line, which in turn leads into transformers 17. Electrically connected to amplifier circuit 10 is a secondary electrical circuit 25 whose function is to provide means for connecting a transmitter hand set 18, or some such similar device, to the amplifier circuit 10. Included in circuit 25 is a plurality of selector switches 30 to 35 which are used to selectively determine the received transmitter operation of the amplifier, either for private or amplified operation of the system.

In conjunction with switches 30 to 35, there is provided an impulse dial 38 having a bell 39 which may be the ordinary ringing unit of the usual telephone system as is shown. Loud speaker 40 is connected to the receiver circuit as by means of conductors 41 and 42 and is kept separate and distinct from the transmitting circuit. In this manner, feed back howling or regenerative effects which are normally present in such circuits are substantially eliminated between the loud speaker circuit as exemplified at 40 and the transmitter circuit shown at 13.

Since the present invention provides a portable communication receiver and transmitter and/or transformer and since many changes could be made in the above construction, it is not intended that the scope thereof be limited by the description, but rather to be determined by the appended claims.

What is claimed is:

1. In a communication system including a handset having a transmitter and receiver in close proximity, the combination of an amplifier circuit having a plurality of electron discharge devices, said electron discharge devices having a full wave rectifier connected to an external output source, means connecting said amplifier circuit to said handset, switch means connected to said handset and said means connecting said amplifier circuit to said handset, means for selectively operating said switch means for receiving and transmitting, an impulse dial connected to said switches for selectively operating said switches, an audio output means connected to said amplifier circuit so as to give an output therefrom, said means connected intermediate said handset and said amplifier circuit including a circuit for opposing the normal feed back between said transmitter and said receiver.

2. In a communication system including a handset having a transmitter and receiver in close proximity to each other, an amplifier circuit having a plurality of discharge devices, circuit means connecting said amplifier circuit to said handset, switch means connected to said handset and said means connecting said amplifier to said handset, means for selectively operating said switch means for receiving and transmitting, an audio output means connected to said amplifier circuit so as to give an output therefrom, said circuit means connecting said amplifier circuit to said handset including a circuit for neutralizing the inherent feedback between transmitter and receiver.

WALTER H. SHAW.

REFERENCES CITED

The following references are of record in the file of this patent:

UNITED STATES PATENTS

| Number | Name | Date |
|---|---|---|
| 2,071,053 | Varley | Feb. 16, 1937 |
| 2,187,901 | Herrick | Jan. 23, 1940 |
| 2,208,160 | McCreary | July 16, 1940 |
| 2,214,212 | Voss | Sept. 10, 1940 |
| 2,214,992 | Chevassus | Sept. 17, 1940 |
| 2,240,509 | Mallalieu | May 6, 1941 |
| 2,369,351 | Herrick | Feb. 13, 1945 |
| 2,402,341 | Patterson | June 18, 1946 |